US009972811B2

(12) United States Patent
Ogawa et al.

(10) Patent No.: US 9,972,811 B2
(45) Date of Patent: May 15, 2018

(54) BATTERY MODULE

(71) Applicant: Kabushiki Kaisha Toshiba, Minato-ku (JP)

(72) Inventors: Takaya Ogawa, Kawasaki (JP); Tomonori Ezoe, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days. days.

(21) Appl. No.: 14/837,462

(22) Filed: Aug. 27, 2015

(65) Prior Publication Data

US 2017/0047562 A1    Feb. 16, 2017

(30) Foreign Application Priority Data

Aug. 11, 2015    (JP) ................. 2015-158631

(51) Int. Cl.
*H01M 2/10* (2006.01)
*H01M 2/02* (2006.01)
*H01M 10/04* (2006.01)

(52) U.S. Cl.
CPC ....... *H01M 2/1016* (2013.01); *H01M 2/0245* (2013.01); *H01M 2/1022* (2013.01);
(Continued)

(58) Field of Classification Search
CPC ............. H01M 2/1005; H01M 2/1011; H01M 2/1016; H01M 2/1022; H01M 2/1027;
(Continued)

(56) References Cited

U.S. PATENT DOCUMENTS

2006/0024578 A1*    2/2006    Lee ................... H01M 2/18
429/208
2009/0305133 A1    12/2009    Yoon et al.
(Continued)

FOREIGN PATENT DOCUMENTS

DE    10 2012 100 862 A1    8/2013
EP    2 381 506 A1    10/2011
(Continued)

OTHER PUBLICATIONS

Extended European Search Report dated Jan. 5, 2016 in Patent Application No. 15182977.7.
(Continued)

*Primary Examiner* — Muhammad S Siddiquee
(74) *Attorney, Agent, or Firm* — Oblon, McClelland, Maier & Neustadt, L.L.P.

(57) ABSTRACT

A battery module according to one embodiment includes a stack of battery cells. The battery module also includes a fitting portion provided with at least one of a concave portion or a convex portion formed on a stack surface of each of the battery cells of the stack. The battery module further includes: a first frame which is fitted with one side surface of the stack and constrains the battery cells in a stacking direction; a second frame which is fitted with another side surface of the stack and constrains the battery cells in the stacking direction; and press members located at respective ends of the stack and connected to the first frame and the second frame. The press members are configured to generate an urging force for pressing electrode members of the battery cells from outside the battery cells.

3 Claims, 10 Drawing Sheets

(52) U.S. Cl.
CPC ....... *H01M 2/1072* (2013.01); *H01M 2/1077* (2013.01); *H01M 10/0413* (2013.01); *H01M 10/0431* (2013.01); *H01M 10/0468* (2013.01); *H01M 10/0481* (2013.01)

(58) Field of Classification Search
CPC ............. H01M 2/1033; H01M 2/1038; H01M 2/1044; H01M 2/1055; H01M 2/1061; H01M 2/1066; H01M 2/105
See application file for complete search history.

(56) References Cited

U.S. PATENT DOCUMENTS

| | | | |
|---|---|---|---|
| 2012/0088146 A1* | 4/2012 | Byun | H01M 10/02 429/163 |
| 2013/0029540 A1 | 1/2013 | Tong et al. | |
| 2015/0214570 A1* | 7/2015 | Deponte | H01M 10/0481 429/99 |

FOREIGN PATENT DOCUMENTS

| | | |
|---|---|---|
| EP | 2 757 611 A1 | 7/2014 |
| JP | 9-115490 | 5/1997 |
| JP | 2006-40901 | 2/2006 |
| JP | 2007-299544 A | 11/2007 |
| JP | 2009-527886 | 7/2009 |
| JP | 2009-182001 | 8/2009 |
| JP | 2010-527110 | 8/2010 |
| JP | 2011-49181 A | 3/2011 |
| JP | 2012-084525 | 4/2012 |
| JP | 2012-160347 | 8/2012 |
| JP | 2013-51048 | 3/2013 |
| JP | 2013-51100 | 3/2013 |
| JP | 2015-49959 | 3/2015 |
| JP | 2015-144099 | 8/2015 |
| WO | WO 2007/083697 A1 | 7/2007 |
| WO | WO 2011/038908 A1 | 4/2011 |
| WO | WO 2014/125605 A1 | 8/2014 |

OTHER PUBLICATIONS

Extended European Search Report dated Oct. 28, 2016 in Patent Application No. 15202389.1.

Japanese Office Action dated Jul. 4, 2017 in Japanese Application No. 2015-158631 (4 pages).

\* cited by examiner

BATTERY MODULE

CROSS-REFERENCE TO RELATED APPLICATION

This application is based upon and claims the benefit of priority from Japanese Patent Application No. 2015-158631, filed Aug. 11, 2015, the entire contents of which are incorporated herein by reference.

FIELD

Embodiments described herein relate generally to a battery module formed by stacking a plurality of battery cells.

BACKGROUND

A battery module is formed by stacking a plurality of battery cells. A battery pack is formed by combining the battery module with a control panel, etc. For example, a battery cell (which is a secondary battery) comprises an outer case, a nonaqueous electrolyte contained in the case, and an electrode member. It is known that a battery cell used repeatedly expands at the end of its battery life because the gas generated inside increases the internal pressure. In a battery module including such an expanded battery cell, the adjacent cells may separate from each other, causing damage to the battery cells. In addition, the electrode member may also separate from the case, resulting in the deterioration of battery performance.

To solve the problems, a method of using a band in the stacking direction of battery cells is known in the art. The band serves to immovably hold the battery cells and to suppress the expansion of the battery cells. However, the use of this method does not completely suppress the expansion of the battery cells because the band is soft and flexible.

Accordingly, the embodiments are intended to provide a battery module which prevents the expansion of a battery cell and the separation of an electrode member, prevents the adjacent battery cells from being displaced from each other at the time of assembly of the battery module, and which can be assembled with ease.

DETAILED DESCRIPTION

A battery module according to an embodiment has a stack structure in which a plurality of battery cells are stacked one upon another, and each battery cell comprises a case and an electrode member received in the case. Each of the stack surfaces of battery cells of the stack structure includes a fitting portion (either a convex portion or a concave portion) with which the adjacent battery cells are positioned and coupled. The battery module of the embodiment comprises: a first frame which is fitted on one side of the stack structure and prevents the stack structure from moving in the stacking direction of battery cells; and a second frame which is fitted on the opposite side of the stack structure and prevents the stack structure from moving in the stacking direction. The battery module of the embodiment comprises press members at the respective ends of the stack structure. The press members are connected to the first frame and the second frame and serve to press the electrode members of the battery cells in the stacking direction from outside.

Figure 1:
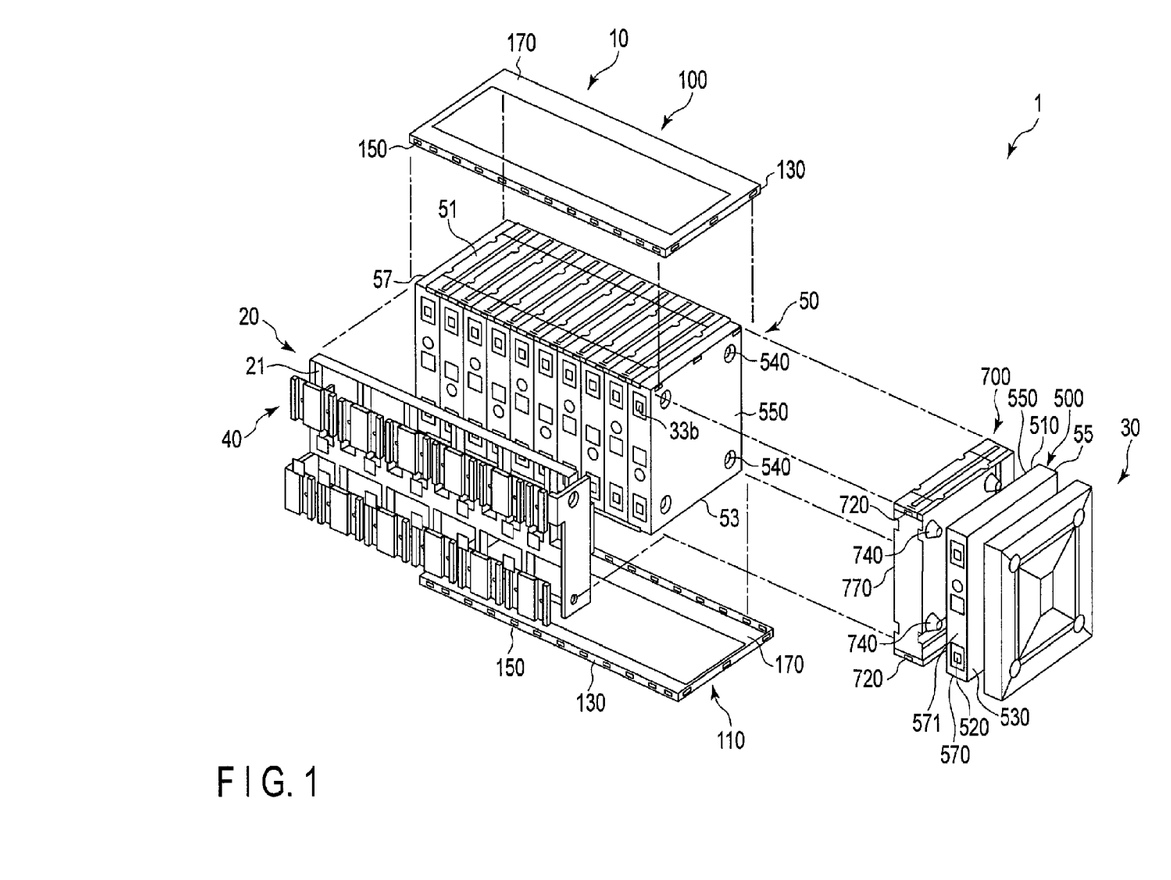
FIG. 1 is an exploded perspective view illustrating a battery module according to an embodiment.
Figure 2:
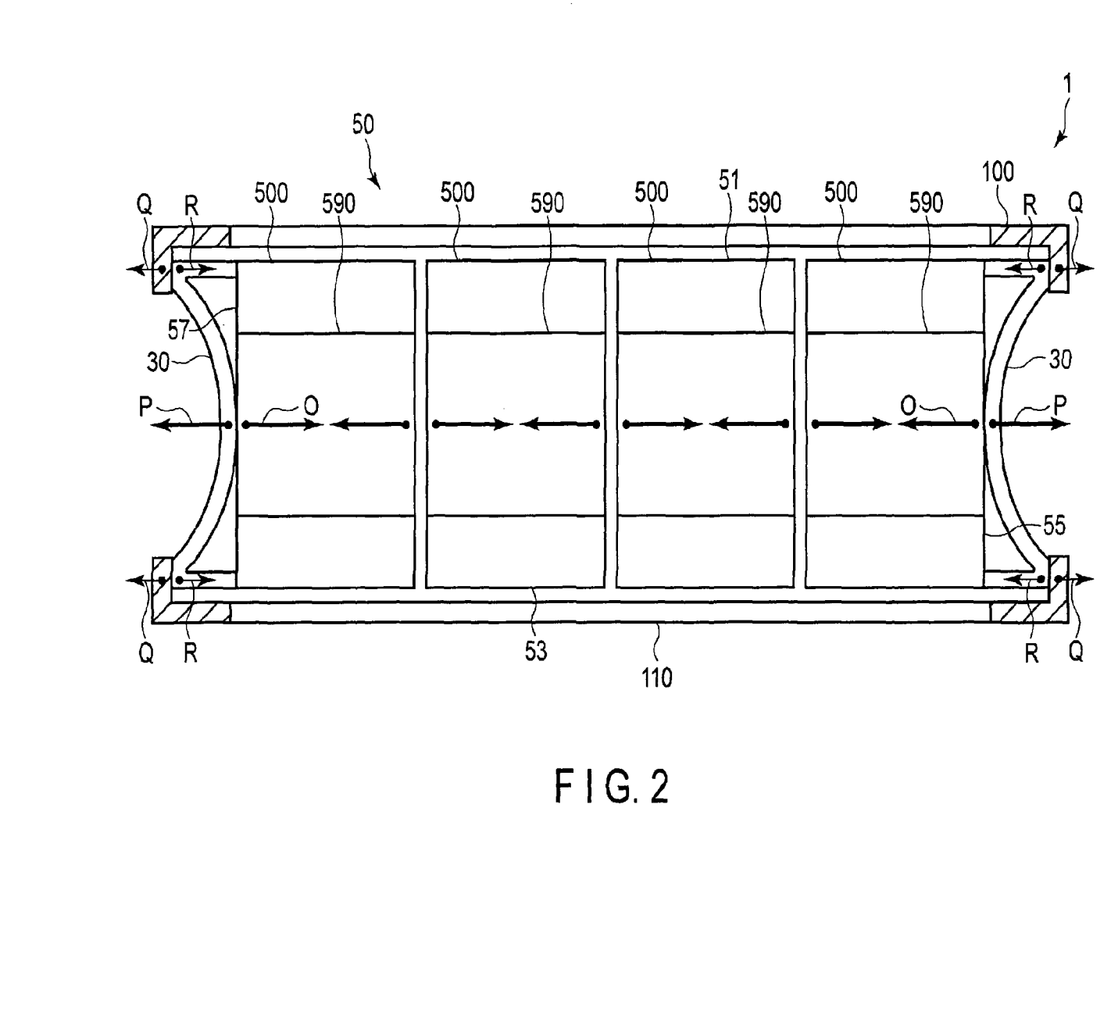
FIG. 2 is a schematic sectional view illustrating an assembled state of the battery module of the embodiment.
Figure 3:
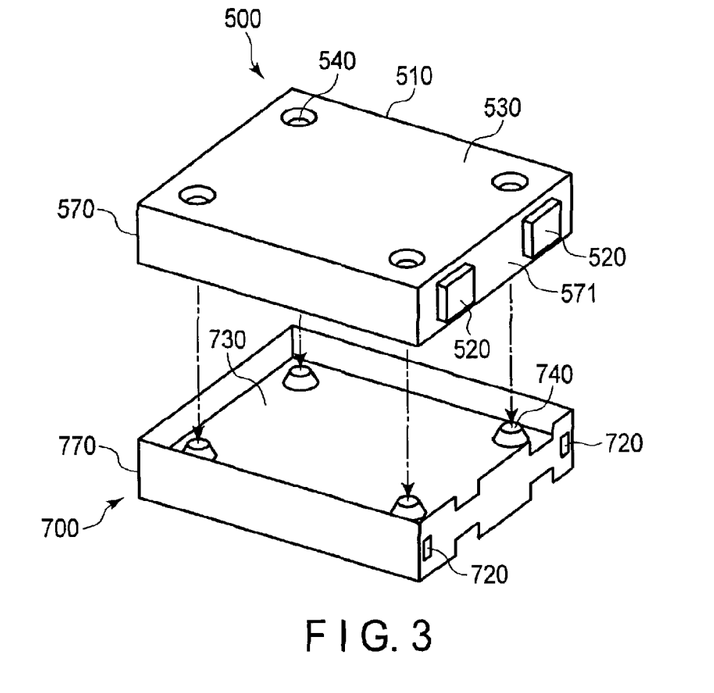
FIG. 3 is a perspective view showing a battery cell and a separator employed in the battery module depicted in FIG. 1.
Figure 4:
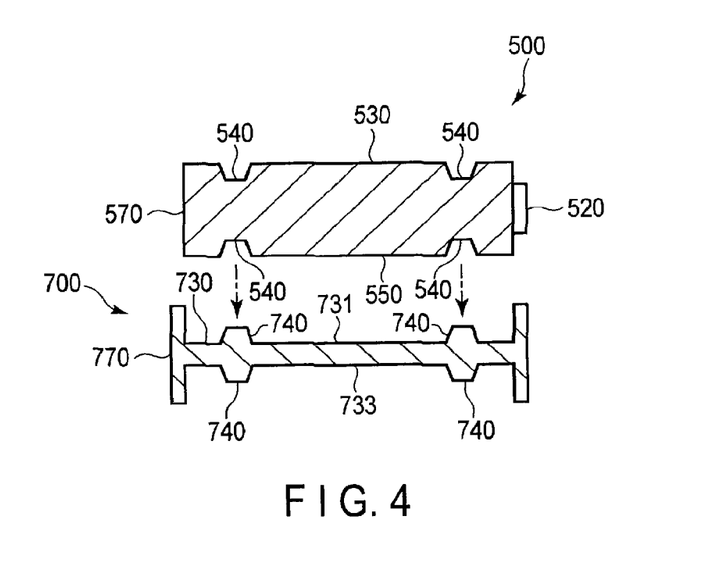
FIG. 4 is a sectional view showing the battery cell and separator depicted in FIG. 3.
Figure 5:
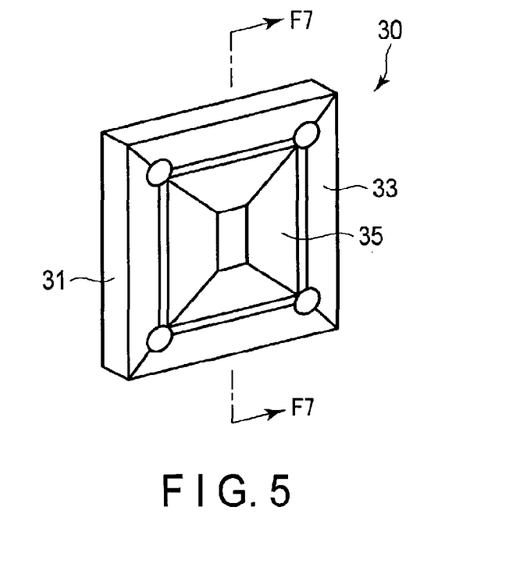
FIG. 5 is a perspective view showing a press member of the battery module depicted in FIG. 1.
Figure 6:
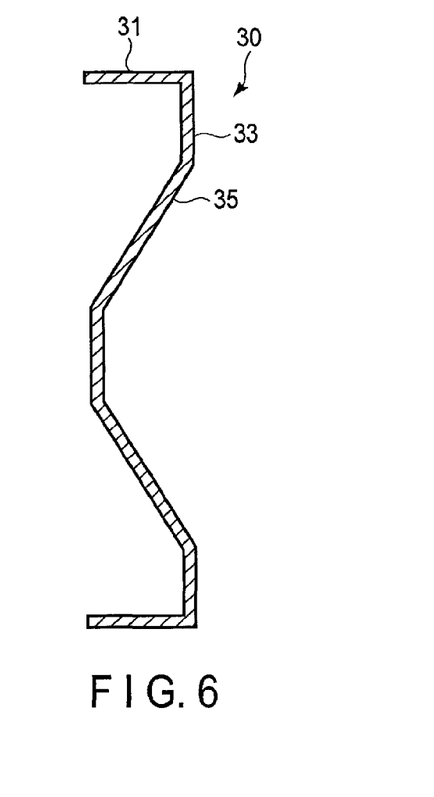
FIG. 6 is a sectional view showing a press member of the battery module depicted in FIG. 5.
Figure 7:
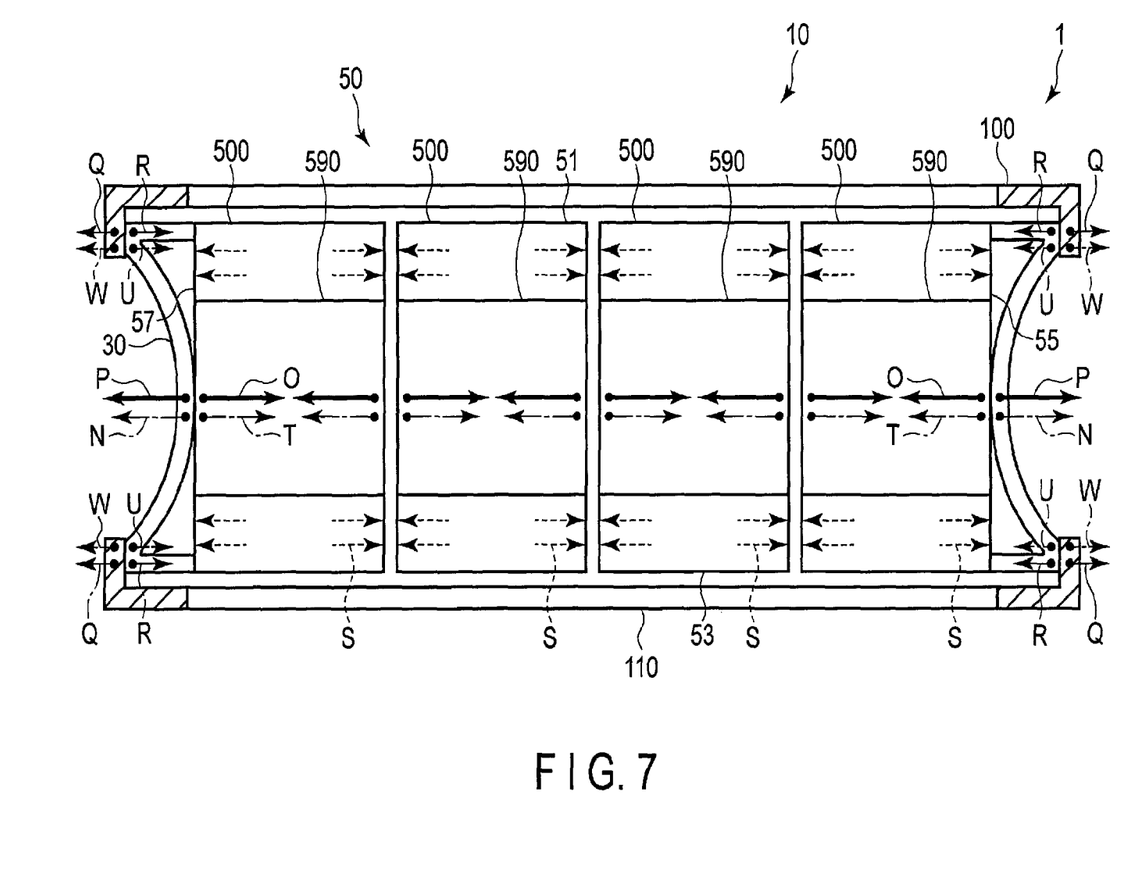
FIG. 7 is a schematic sectional view illustrating a load generated in the battery module of the embodiment.

A battery module 1 according to the first embodiment will be described with reference to FIGS. 1 through 7. FIG. 1 is an exploded perspective view of the battery module of the embodiment. FIG. 2 is a schematic sectional view illustrating an assembled state of the battery module. FIG. 3 is a perspective view showing a battery cell and a separator employed in the battery module depicted in FIG. 1. FIG. 4 is a sectional view showing the battery cell and separator depicted in FIG. 3. FIG. 5 is a perspective view showing a press member of the battery module depicted in FIG. 1. FIG. 6 is a sectional view showing the press member of the battery module depicted in FIG. 5. FIG. 7 is a schematic sectional view illustrating a load generated in the battery module of the embodiment.

As shown in FIG. 1, the battery module 1 comprises a plurality of battery cells 500, a plurality of separators 700, a plurality of bus bars 40, a terminal-side frame 20 for fixing the bus bars 40, a frame 10, and two leaf springs (press members) 30. The separators 700 are insulating members interposed between the adjacent battery cells 500. The bus bars 40 electrically connect the battery cells 500 together. The frame 10 immovably holds the battery cells 500 as one unit.

Each battery cell 500 includes a rectangular case 510. The case 510 includes a first surface 530 and a second surface 550 which are substantially rectangular and are opposed to each other. The case 510 also include four side surfaces 570 between the first surface 530 and the second surface 550.

One of the side surfaces 570 is a terminal surface 571, on which two terminals 520 are provided. One of the two terminals 520 is a positive terminal, and the other terminal is a negative terminal. A nonaqueous electrolyte fills the interior of the case 510. An electrode member 590 is arranged inside the case 510. The electrode member 590 is obtained, for example, by coiling a flat stack member made up of a positive layer, a negative layer and an insulating member interposed therebetween. The battery cell 500 is a so-called secondary battery.

FIG. 2 is a sectional view illustrating an assembled state of the battery module of the embodiment. The separators 700 are not shown in FIG. 2. The number of battery cells 500 shown in FIG. 2 is merely an example. In other words, the number of battery cells 500 arranged in the frame 10 is not limited to that shown in FIG. 2. As shown in FIG. 2, the battery cells 500 are arrayed inside the frame 10 in such a manner as to form a stack 50.

As shown in FIGS. 3 and 4, concave portions 540 are formed at the respective four corners of the first surface 530 of the battery cell 500. Similarly, concave portions 540 are also formed at the respective four corners of the second surface 550. When the battery cell 500 is attached to the separator 700, to be mentioned below, the four concave portions 540 are fitted with the four convex portions 740 of the separator 700. The concave portions 540 are formed, for example, by press working when the case 510 is worked.

According to the present embodiment, the battery cell is provided with a terminal surface 571 on which two terminals 520 are provided. The battery cells 500 are arranged in such a manner that their positive sides and negative sides alternate. In other words, the battery cells 500 are stacked in such a manner that their terminal surfaces 571 are orientated in the same direction and that the second surface 550 of one of the adjacent battery cells 500 faces the second surface 550 of the other of the adjacent battery cells 500.

The separator 700 is an insulating rectangular member interposed between the adjacent battery cells 500.

As shown in FIG. 3, the separator 700 comprises an inner plate 730 slightly larger than the first surface 530 of the battery cell 500. The separator 700 comprises side walls 770 provided along the periphery of the inner plate 730 and configured to support the battery cell 500. The separator 700 fixes two battery cells 500 which are fitted with the respective surfaces of the inner plate 730. Projections 720 fitted with the frame 10 (to be mentioned below) are formed at the respective corners of each side wall 770. The separator 700 is formed, for example, of an insulating resin material.

As shown in FIGS. 3 and 4, four convex portions 740 are provided on the respective four corners of the first surface 731 of the inner plate 730. The four convex portions 740 are fitted in the four concave portions 550 on the second surface of the battery cell 550. In FIGS. 3 and 4, the arrows indicate the direction in which the battery cell 500 and the separator 700 are fitted with each other.

As shown in FIG. 4, four convex portions 740 are provided on the respective four corners of the second surface 731, which is opposite to the first surface 730 of the inner plate 730. The four convex portions 740 are fitted in respective four concave portions 540 of the battery cell 500 arranged on the second surface 733.

As shown in FIG. 1, the frame 10 is arranged to surround the battery cells 500 and the separators 700. To be more specific, according to the embodiment, the frame 10 includes an upper surface frame (a first frame) 100, which is depicted as being upper and located on one surface side in FIG. 1, and a lower surface frame (a second frame) 110, which is depicted as being lower and located on the other surface side in FIG. 1. A stack 50, comprising for example eleven battery cells 500 and ten separators 700 interposed in between, is arranged inside the frame 10. According to the present embodiment, the frame is made of a metallic material.

Needless to say, however, the frame 10 is not limited to the metallic material but may be a resin provided that the resin has a required mechanical strength.

The first frame 100 is rectangular and has a periphery greater than that of the upper surface 51 of the stack 50 including a plurality of battery cells 500. As shown in FIG. 1, the first frame 100 has a plurality of holes 150 in the peripheral wall 130. The holes 150 are fitted with the projections 720 formed at the corner portions of the side walls 770 of the separator 700. In other words, the holes 150 serve to fix the first frame 100 to the upper surface 51 (see FIG. 1). As shown in FIG. 1, the first frame 100 includes an annular projection 170 which extends from that end of the peripheral wall 130 depicted as being upper in FIG. 1. The projection 170 surrounds the periphery of the upper surface 51.

Likewise, the second frame 110 is rectangular and has a periphery greater than that of the lower surface 53 of the stack 50 including a plurality of battery cells 500. As shown in FIG. 1, the second frame 110 has a plurality of holes 150 in the peripheral wall 130 thereof. The holes 150 are fitted with the projections 720 formed at the corner portions of the side walls 770 of the separator 700. In other words, the holes 150 serve to fix the second frame 110 to the lower surface 53 (see FIG. 1). As shown in FIG. 1, the second frame 110 includes an annular projection 170 which extends from that end of the peripheral wall 130 depicted as being lower in FIG. 1. The projection 170 surrounds the periphery of the lower surface 53. With this structure, the first frame 100 keeps the upper surface 51 of the stack 50 from moving in the stacking direction, and the second frame 110 keeps the lower surface 53 of the stack 50 from moving in the stacking direction.

The terminal-side frame 20 is arranged to face the terminal surface 571 of the battery cell 500. The terminal-side frame 20 has a plurality of rectangular openings 21. The openings 21 are arranged in a lattice pattern, and a bus bar 40 is provided in each of the openings 21.

As shown in FIG. 1, the bus bar 40 is a plate-like member and electrically connects the adjacent terminals 520 (e.g., positive and negative electrodes) of the battery cells 500 that are adjacent in the stacking direction. That is, the bus bar 40 functions as part of an electrical circuit that connects the battery cells 500. The bus bar 40 is arranged in one of the openings 21 of the terminal-side frame 20 and is fixed to the terminals 520.

As shown in FIG. 1, the leaf spring 30 is a press member provided at one end 55 of the stack 50 and at the other end of the 57 of the stack 50. To be more specific, the leaf spring 30 is a rectangular press member having substantially the same size as the first surface 530 of the battery cell 500, as shown in FIGS. 5 and 6. The leaf spring 30 has a substantially M-shaped cross section, as shown in FIG. 6.

That is, the leaf spring 30 comprises: legs 31 which are brought into contact with the first surface 530 or the second surface 550 of the battery cell 500; and a curved portion 33 having a quadratic surface 31 and configured to cover one of the legs 31. As shown in FIG. 5, the curved portion 33 has a concave portion 35 which is depressed at the center thereof. The leaf spring 30 having this shape is arranged in contact with the frame 10 at one end 55 or at the other end 57. In other words, the leaf spring 30 is connected to the first frame 100 and the second frame 110 and is interposed between an end face of the stack 50 and the frame 10. The leaf spring 30 presses the battery cell 500 from outside, thereby preventing the battery cell 500 from expanding due to an increase in the internal pressure.

A structural feature of the battery module 1 of the first embodiment will be described with reference to FIGS. 2 and 7. FIG. 2 is a schematic sectional view illustrating how loads are applied to the respective members of the battery module 1 of the embodiment in an assembled state of the battery module 1. FIG. 7 is a schematic sectional view illustrating how loads are applied to the respective members of the battery module 1 in a state where the internal pressure is increased due to the gas generated inside the battery cells 500. In FIGS. 2 and 7, the illustration of the separator 700 and the illustration of some other members are omitted so that the directions in which forces are applied can be clearly understood. The directions of the arrows indicate the directions in which loads are applied. The lengths of the arrows indicate the magnitudes of the loads.

First, a description will be given, with reference to FIG. 2, of the directions of the loads applied in the initial state of the battery module 1. As described above, the first frame 100 of the battery module 1 constrains the upper surface 51 of the stack 50 in the stacking direction. The second frame 110 of the battery module 1 constrains the lower surface 53 of the stack 50 in the stacking direction. Two leaf springs 30 are provided, one of them at one end 55 of the stack 50 and the other at the other end 57 of the stack 50. The two leaf springs 30 and the stack 50 are arranged and secured inside the first frame 100 and the second frame 110. The electrode member 590 is provided inside each battery cell 500.

In FIG. 2, arrows O and arrows Q indicate preloads of the leaf springs 30. Arrows P indicate a reaction which the electrode members 590 produce in response to the preloads of the leaf springs 30. Arrows R indicate a reaction which the frame 10 produces in response to the preloads of the leaf springs 30.

In FIG. 7, the same arrows as are shown in FIG. 2 indicate the same loads. Arrows S indicate internal-pressure loads applied due to the gas generated in the battery cells. Arrows T and arrows W indicate preloads which are additionally generated by the internal-pressure loads. Arrows U indicate reactions which the frame 10 additionally generates in response to the internal-pressure loads. Arrows N indicate reactions which the electrode members 590 additionally generate in response to the internal-pressure loads.

The stack 50 is constrained in the state where it is pressed from both sides in the stacking direction of the battery cells 500. The battery module 1 employs the leaf springs 30 so that one of them is at one end of the stack 50 and the other is at the other end of the stack 50. The battery module 1 employs the frame 10 so that the stack 50 and the leaf springs 30 are surrounded and fixed thereby. As a result, the stack 50 is constrained inside the frame 10.

As shown in FIG. 2, the leaf springs 30 are interposed between the frame 10 and the stack 50, and in this state generate leaf-spring preloads. The leaf-spring preloads include a load (indicated by arrows O) applied to the stack 50 and a load (indicated by arrows Q) applied to the legs 31 of the leaf springs 30. The reactions of the leaf-spring preloads that is generated in response to the load applied to the frame 10 for supporting the legs 31, are indicated by arrows R. In FIG. 2, the load indicated by arrow O is equal to the sum of the loads indicated by two arrows Q.

The reactions which are equal to the preloads (arrows O) of the leaf springs 30 are indicated by arrows P. The reactions indicated by arrow P are applied from the electrode members 590 to the leaf springs 30 by way of the cases 510 of the battery cells 500.

In the battery cells 500 that are not in contact with the leaf springs 30, reactions are generated by the electrode members 590 in response to the leaf-spring preloads, as indicated by arrows O, and the electrode members 590 are held, accordingly.

In other words, the leaf-spring preloads (indicated by arrows O) are equal to the reactions (indicated by arrows P) which the electrode members 590 generate in response to the leaf-spring preloads. Furthermore, the reactions which the frame 10 generates in response to the leaf-spring preloads (indicated by arrows R) are equal to the leaf-spring preloads (indicated by arrow Q). In this manner, the battery module 1 employs the frame 10 and the leaf springs 30 to constrain the stack 50, thereby permitting the electrode members 590 to be constrained inside the case 510.

As shown in FIG. 7, A gas is generated inside the battery cells 500 if the battery cells 500 used for repeatedly. Due to the gas generated, internal-pressure loads (indicated by arrows S as distributed loads) are generated inside the battery cells 500. Because of the generated internal-pressure loads, the battery cells 500 inside the stack 50 press the adjacent battery cells 500. In addition, because of the generated internal-pressure loads, the leaf springs 30 are pressed at one end 55 and the other end 57 of the stack 50.

As described above, in the battery module 1 of the embodiment, four concave portions 540 are provided at the respective four corners of the first surface 530 and second surface 559 of the battery cell 500. The separator 700 is provided with four convex portions 740 which are fitted in the respective four concave portions 540 of the battery cell 500. By fitting the convex portions 740 into the concave portions 540, the battery module 1 enables a plurality of battery cells 500 to be assembled with a high degree of accuracy. Accordingly, the battery module 1 can be assembled with a high degree of integrity. Because the battery module 1 has a structure in which the convex portions 740 are fitted into the concave portions 540, the battery cells 500 and the separators 700 are hard to disengage from.

In addition, the frame 10 constrains the eight corners of the end portions of the stack 50 in the stacking direction, by the tensile load. In other words, in the battery module 1, the direction in which the frame 10 constrains the stack 50 is the same as the direction in which the battery cells 500 are fitted with the separators 700. Therefore, the battery module 1 can stably hold the stack 50 even if the internal-pressure loads increase in the stack 50. The frame 10 is made of a material which is rigid and strong in the tensile direction.

In the battery module 1 having this structure, the leaf springs 30 and the frame 10 are combined with each other in such a manner as to fully absorb the increase in the internal-pressure loads generated inside the battery cells 500. Even in the terminal period of use of the battery module 1, the battery cells 500 of the stack 50 do not deform despite an increase in the internal pressure.

In other words, the battery module 1 of the embodiment reliably constrains the four corners of each end of the stack 50 by means of the frame 10. In addition, the internal-pressure loads acting in the center of each of the end faces of the stack 50 are suppressed by the preloads of the leaf springs 30. Furthermore, the preloads of the leaf springs 30 act on all battery cells 500 in the stacked state as a result of action and reaction. Thus, the electrode members 590 inside the cases 510 of the battery cells 500 are applied with the preloads of the leaf springs 30 and are therefore confined to the predetermined positions in the cases 510, even if the internal-pressure loads increase.

In other words, the battery module 1 of the embodiment comprises leaf springs 30 and a frame 10 capable of applying preloads that sufficiently absorb an increase in the internal-pressure loads of the battery cells 500, and the expansion of the cases of the battery cells 500 can be suppressed. The battery module 1 comprises leaf springs 30 and a frame 10 capable of applying preloads that sufficiently absorb an increase in the internal-pressure loads of the battery cells 500, and the electrode members 590 are constrained by the cases 510 of the battery cells 500. The electrode members 590 are prevented from disengaging from the cases 510, and deterioration in the battery performance is thus prevented.

The first frame 100 and the second frames 110 comprise projections 170. The projections 170 also function to position the frame 10 when this frame 10 is attached to the stack 50. In other words, the position of the frame 10 which enables the stack 50 to be properly constrained is detected beforehand, the peripheral wall 130 is formed to have a width corresponding to that position, and the projection 170 can be provided at one side of the peripheral wall 130. The frame 10 fabricated in this manner is advantageous in that the constraining position does not have to be determined in accordance with each stack 50 in the constraining process of the stack 50. In other words, the frame 10 is fitted by pressing it until its projection 170 comes into contact with one side surface (upper surface 51) or another side surface (lower surface 53). Accordingly, the assembling operation can be performed efficiently.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, in the battery module of the above embodiment, the battery cells 500 and the separators 700 are fixed to each other by fitting the four convex portions 740 into the four concave portions 540 located at the corresponding positions. However, the convex portions 740 and concave portions 540 are not limited to this structure.

Figure 8:
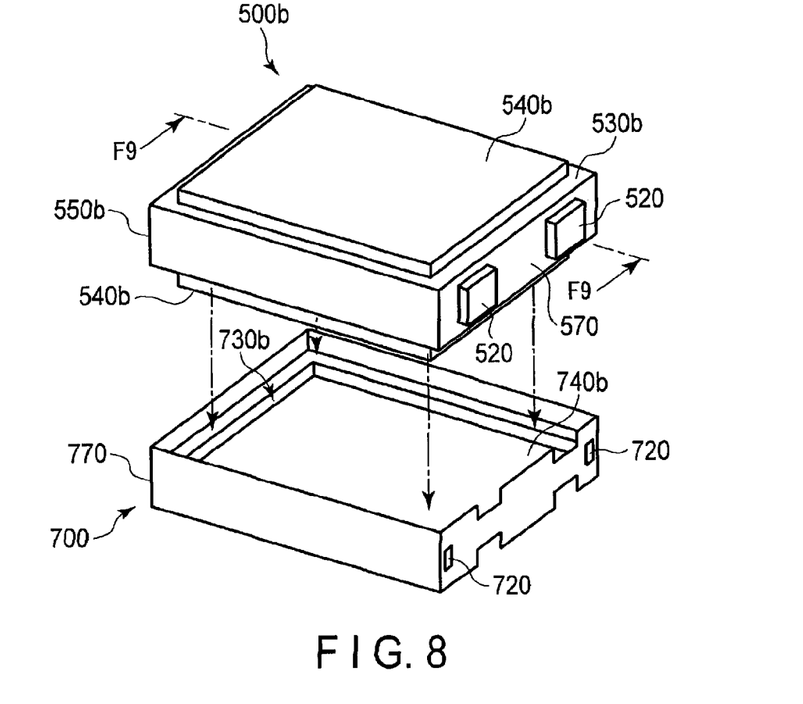
FIG. 8 is a perspective view illustrating a modification of the battery cell and separator of the embodiment.
Figure 9:
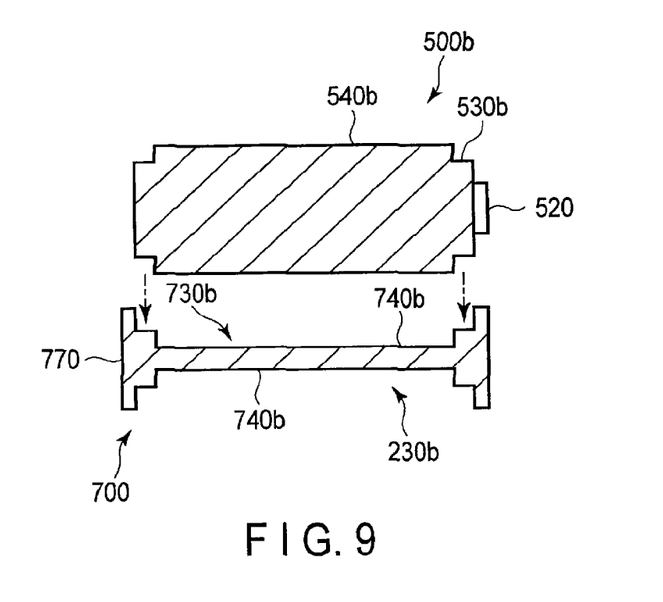
FIG. 9 is a sectional view showing how the battery cell and separator depicted in FIG. 8 look like when they are cut along line F9-F9 in FIG. 8.

For example, as shown in FIGS. 8 and 9, a convex portion 540b with a stepped section is formed on the first surface 530b of a battery cell 500b, and similarly a convex portion 540b with a stepped section is formed on the second surface. A separator 700 comprises concave portions 740b formed on the respective surfaces of an inner plate 730b and corresponding in shape to the convex portions 540b. With this structure, the battery cell 500 and the separator 700 can be easily assembled together by merely fitting the convex portion 540b in the concave portion 740b, and the assembling operation can be performed efficiently. The concave portions 740 may be formed on the battery cell, in which case the convex portions 540b are formed on the separator. Which component (a battery cell or a separator) should have convex portions 540b (or the concave portions 740b) can be properly determined in accordance with the material used for forming the convex and concave portions.

Figure 10:
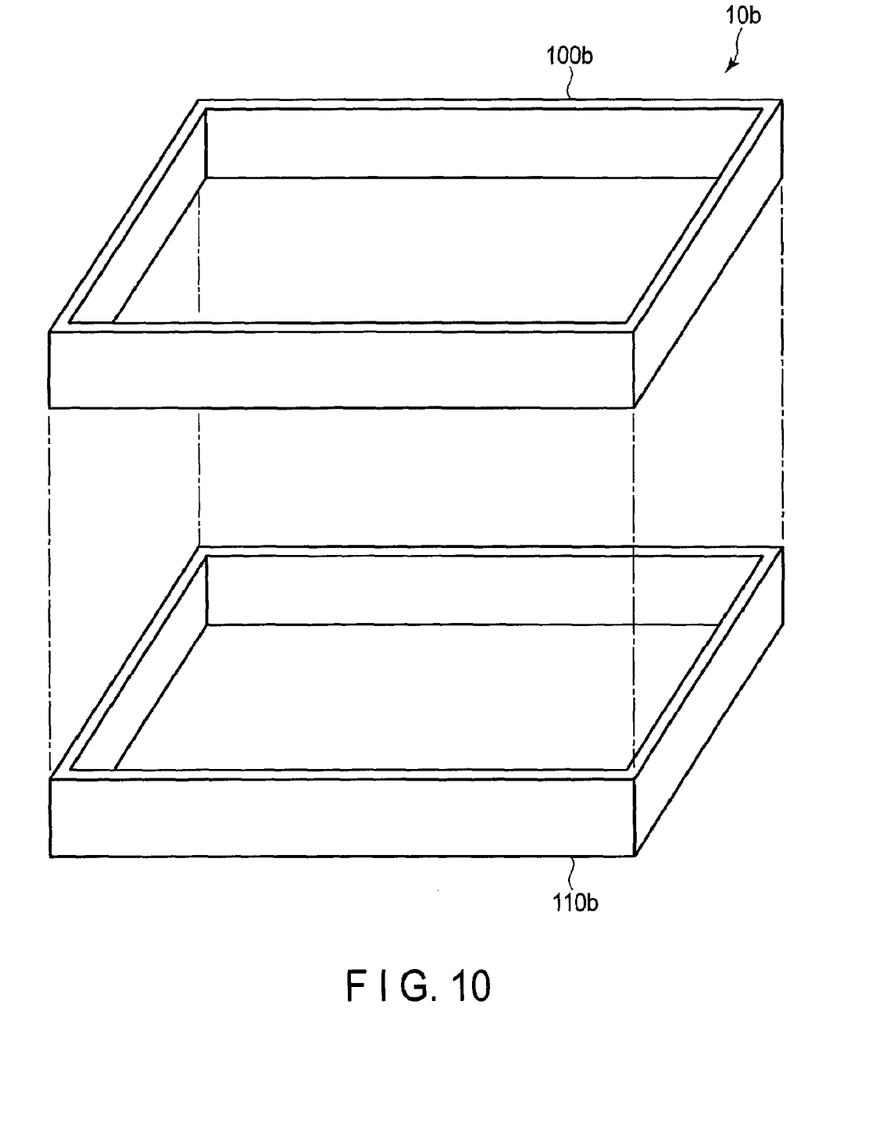
FIG. 10 is a perspective view illustrating a modification of a frame attached to the battery module of the embodiment.

In the battery module 1 of the above embodiment, the frame 10 comprises an annular projection 170 for covering part of the upper surface 51 or lower surface 53, but the frame 10 is not limited to this structure. For example, as shown in FIG. 10, the frame 10b may be a tubular frame without the projection 170 described above. In other words, the frame 10b need not be flexed in response to the internal-pressure load acting from inside the battery cells 500; it may be a rigid frame capable of constraining the stack 50.

In the battery module 1 of the above embodiment, the leaf springs 30 are interposed between the frame 10 and the stack 50 as separate members, but are not limited to this structure. The leaf springs 30 may be replaced with a support member capable of applying a sufficient preload to the stack 50. For example, a support member enabling the first frame 100 and the second frame 110 to be integrally connected may be used.

In the battery module 1 of the embodiment, the internal space of the concave portion 540 of the battery cell 500 is filled with a nonaqueous electrolyte, but the internal space of the concave portion 540 is not limited to this state.

Figure 11:
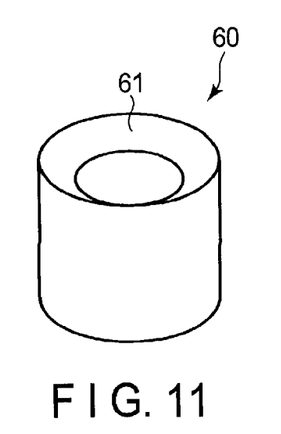
FIG. 11 is a perspective view illustrating a holding member provided in the battery cell of the embodiment.
Figure 12:
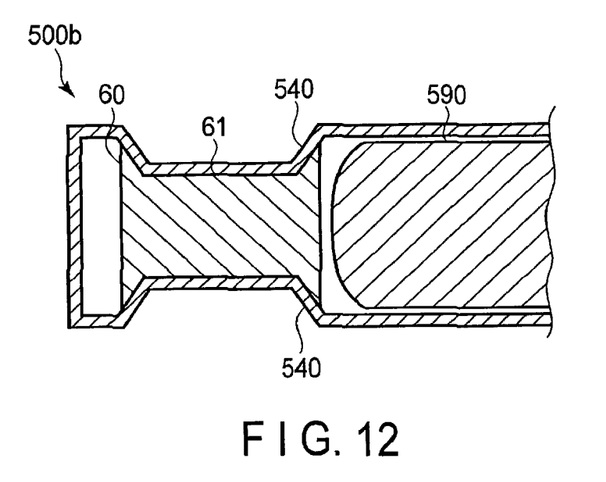
FIG. 12 is a cross sectional view illustrating how the holding member depicted in FIG. 11 is provided inside the battery cell.

For example, as shown in FIGS. 11 and 12, a cylindrical piece 60 may be arranged inside the concave portion 540 of a battery cell 500b. This cylindrical piece 60 ensures high positioning accuracy of the battery cell 500b and also functions as a support member capable of supporting the battery cell 500b against the pressure applied at the time of stacking.

Figure 13:
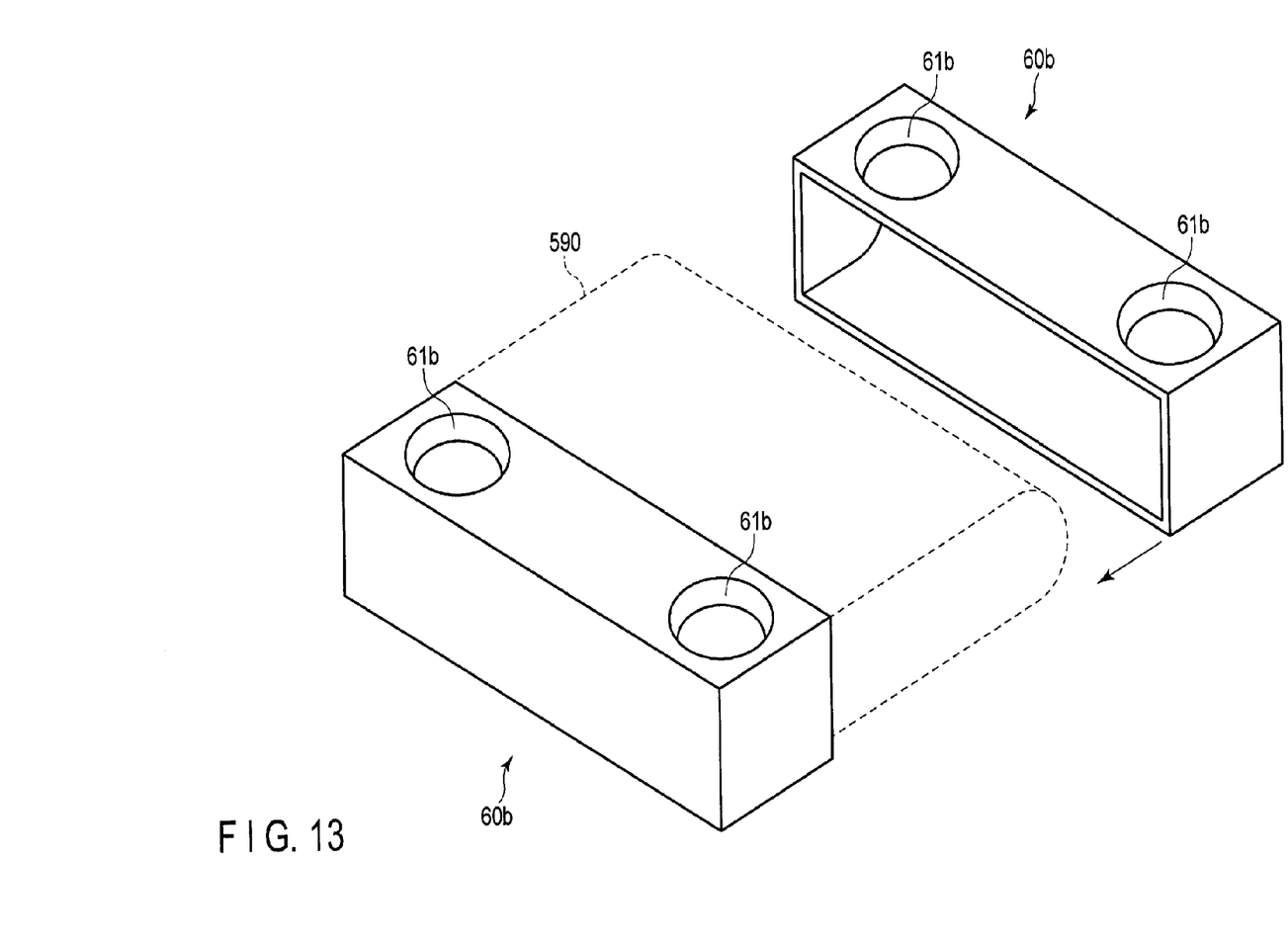
FIG. 13 is a perspective view illustrating a modification of the holding member provided in the battery cell of the embodiment.
Figure 14:
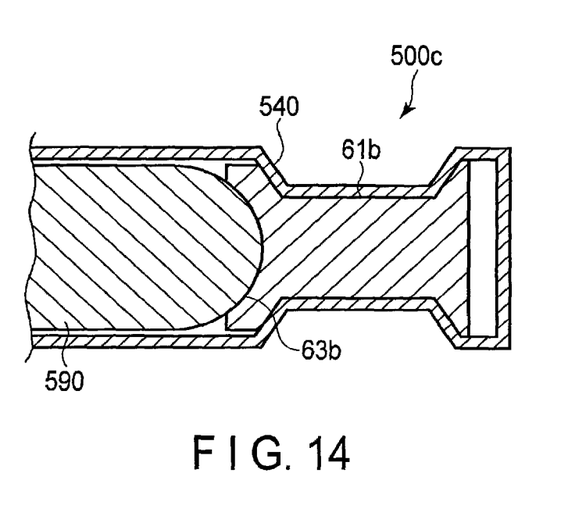
FIG. 14 is a cross sectional view illustrating how the holding member depicted in FIG. 13 is provided inside the battery cell.

The cylindrical piece 60 is not limited to what was described above. That is, as shown in FIGS. 13 and 14, the cylindrical piece 60 may be replaced with a substantially rectangular tube member 60b having one end covered. The tube member 60b has a concave portion 61b at the position corresponding to the concave portion 540 of a battery cell 500c. A support portion 63b extending along the electrode member 590 is formed in the opening of the tube member 60b. Two tube members 60b, each having this structure, serve to support the ends of the electrode member 590 inside the battery cell 500c and also serve as holding tools for holding the electrode member 590 and thereby preventing the electrode member 590 from moving inside the battery cell 500c.

With this structure, even if the battery cells 500c begin to deform due to an increase in the internal pressure, the tube members 60b reliably hold the electrode members 590, and the electrode members 590 are prevented from being shifted in position or separating from the battery cells.

The invention claimed is:

1. A battery module comprising:
   a stack comprising a plurality of battery cells, each of the battery cells comprising a case and an electrode member contained in the case;
   a fitting portion comprising at least one of a concave portion or a convex portion formed on a stack surface of each of the battery cells of the stack, the fitting portion positioning and coupling adjacent ones of the battery cells;
   a first frame which is fitted with one side surface of the stack and constrains the battery cells in a stacking direction;
   a second frame which is fitted with another side surface of the stack and constrains the battery cells in the stacking direction; and
   press members located at respective ends of the stack and connected to the first frame and the second frame, the press members being configured to generate an urging force for pressing the electrode members of the battery cells from outside the battery cells,
   wherein the stack comprises a separator formed of an insulating material and interposed between adjacent ones of the battery cells, and the separator comprises (i) a convex portion which is formed on a joining surface in contact with one of the battery cells and is fitted with the concave portion of the fitting portion, or (ii) a concave portion which is fitted with the convex portion of the fitting portion, wherein the press members are leaf springs formed in a rectangular shape and having a same size as the stack surface of the battery cells in the stacking direction, wherein the press members each include legs that are brought into contact with a periphery of the stacked surface of a respective outermost battery cell, wherein each press member has a concave portion formed at a center thereof, the concave portion facing in a direction of the stack of battery cells, and wherein the leaf springs are arranged and secured inside the first frame and the second frame.

2. The battery module according to claim 1, wherein each of the battery cells comprises a holding member located inside the case and fitted with the fitting portion, thereby supporting the battery cell in the stacking direction.

3. The battery module according to claim 2, wherein the holding member holds the electrode member inside the battery cell.

\* \* \* \* \*